(12) United States Patent
Ogo et al.

(10) Patent No.: US 7,771,304 B2
(45) Date of Patent: Aug. 10, 2010

(54) DOUBLE-SIDED ENGAGEMENT TYPE SILENT CHAIN

(75) Inventors: Toshitaka Ogo, Osaka (JP); Kazuhiko Shimaya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 647 days.

(21) Appl. No.: 11/520,537

(22) Filed: Sep. 13, 2006

(65) Prior Publication Data

US 2007/0111835 A1 May 17, 2007

(30) Foreign Application Priority Data

Nov. 11, 2005 (JP) .............................. 2005-327735

(51) Int. Cl.
*F16G 13/04* (2006.01)
*C21D 1/20* (2006.01)
(52) U.S. Cl. ..................... 474/213; 474/212; 148/598
(58) Field of Classification Search ................. 474/212, 474/213; 148/336, 598
See application file for complete search history.

(56) References Cited

U.S. PATENT DOCUMENTS

| 6,142,902 A | 11/2000 | Ichikawa et al. |
| 6,334,829 B1 | 1/2002 | Saito et al. |
| 6,364,800 B1 * | 4/2002 | Avramidis et al. .......... 474/213 |
| 6,419,604 B2 | 7/2002 | Saito et al. |
| 6,440,022 B1 | 8/2002 | Ichikawa et al. |
| 2003/0070737 A1 * | 4/2003 | Jackson et al. .............. 148/598 |
| 2003/0098098 A1 * | 5/2003 | Petersen et al. ............. 148/336 |
| 2006/0199691 A1 * | 9/2006 | Matsui et al. ............... 474/212 |

FOREIGN PATENT DOCUMENTS

| JP | 2553206 | 7/1997 |
| JP | 11-166600 | 6/1999 |
| JP | 11-257439 | 9/1999 |

\* cited by examiner

*Primary Examiner*—Robert A Siconolfi
*Assistant Examiner*—Stephen Bowes
(74) *Attorney, Agent, or Firm*—Howson & Howson LLP (57) ABSTRACT

In a double-sided engagement silent chain having inner link plates with inwardly protruding teeth, outermost link plates with outwardly protruding teeth, and outer link plates with outwardly protruding teeth, adjacent the outermost link plates, the plates are composed of a bainite and martensite mixed plate material. The bainite mixing ratio in the outermost link plates is higher than the bainite mixing ratio of the inner link plates and the adjacent outer link plates. The martensite mixing ratio of the inner link plates and of the adjacent outer link plates is higher than the martensite mixing ratio in the outermost link plates. The heights of the backs of the outermost link plates, measured from the tooth gap bottoms, are greater than the corresponding heights of the backs of the inner link plates, and may be equal to or greater than the heights of the backs of the adjacent outer tooth plates.

2 Claims, 7 Drawing Sheets

DOUBLE-SIDED ENGAGEMENT TYPE SILENT CHAIN

CROSS-REFERENCE TO RELATED APPLICATION

This application claims priority on the basis of Japanese patent application 2005-327735, filed Nov. 11, 2005. The disclosure of Japanese application 2005-327735 is hereby incorporated by reference.

FIELD OF THE INVENTION

This invention relates to silent chain of the type used as a timing chain in an automobile engine, and more specifically to a double-sided engagement type silent chain in the form of an endless loop, which, in an engine, typically has teeth on the inside of the loop in engagement with a crankshaft sprocket, an intake valve cam sprocket, and an exhaust valve cam sprocket, and teeth on the outside of the loop engaged with a sprocket for driving an auxiliary device such as an oil pump or the like.

BACKGROUND OF THE INVENTION

Japanese Laid-open Patent Publication No. Hei. 11-166600, U.S. Pat. Nos. 6,142,902, 6,334,829, 6,419,604 and 6,440,022, and Japanese Utility Model Publication No. 2553206 all show double-sided engagement type silent timing chains in which link teeth protruding on the inside of a loop formed by the chain engage one or more sprockets while link teeth protruding on the outside of the loop engage another sprocket so that the inside and outside sprockets rotate in opposite directions.

In a typical engine timing drive, the crankshaft sprocket, and the intake valve and exhaust valve cam sprockets are engaged with teeth on the inside of the loop and rotate in the same direction, while one or more auxiliary sprockets, for example an oil pump driving sprocket, are engaged with teeth on the outside of the loop, and rotate in the opposite direction.

Figure 6:
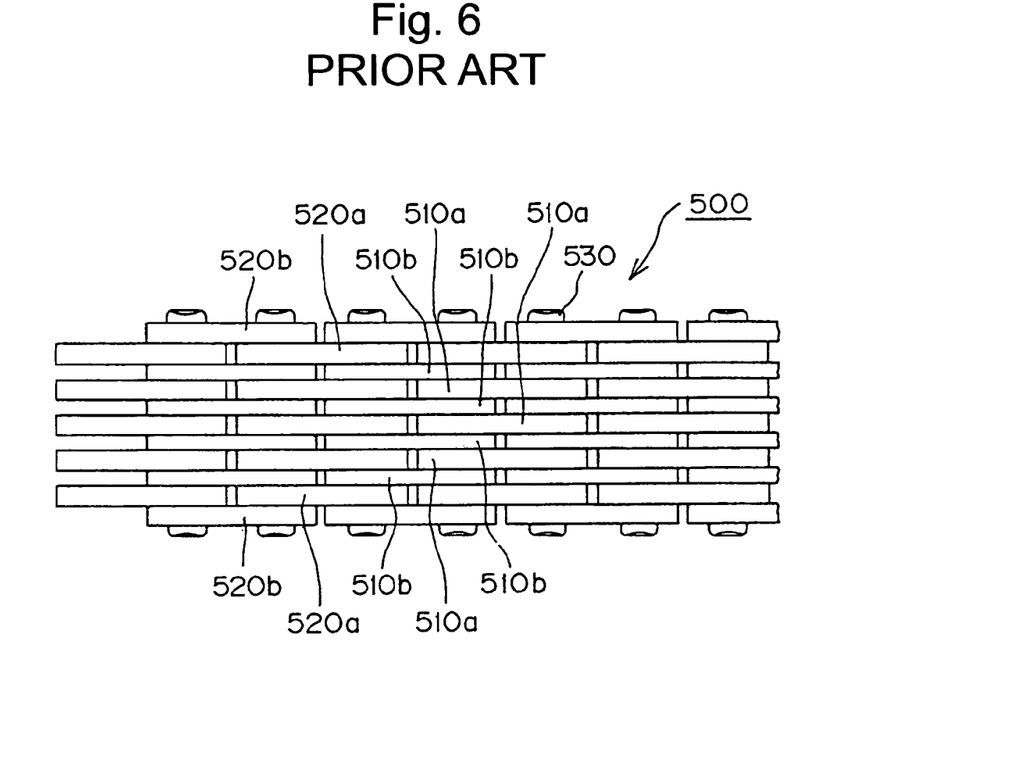
FIG. 6 is a plan view showing a part of a conventional double-sided engagement type silent chain.
Figure 7:
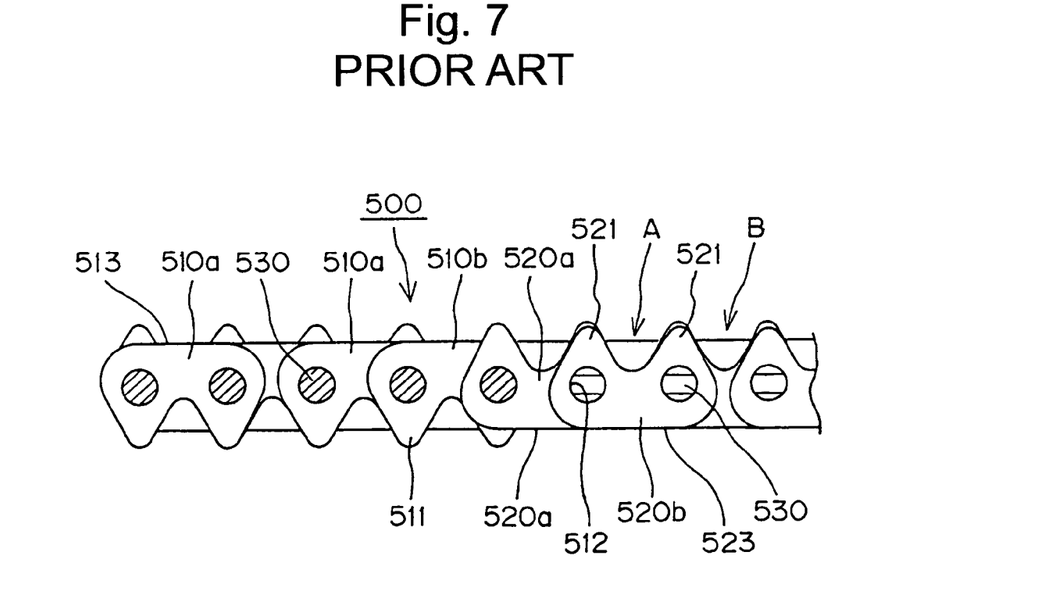
FIG. 7 is a side elevational view of a portion of the chain shown in FIG. 6.

FIGS. 6 and 7 show a conventional double-sided engagement type silent chain 500. The chain is composed of interleaved, alternate, first and second widthwise rows of link plates. A first row consists of inner link plates 510a flanked by a pair of outer link plates 520a. A second row consists of inner link plates 510b flanked by a pair of outer link plates 520b. Link plates 520b are the outermost link plates of the chain. The alternate rows are connected by connecting pins 530, which are fixed in pin holes 512 in the outermost link plates, 520b. The pin-holes in the other link plates, including outer link plates 520a as well as link plates 510a and 510b, fit rotatably on the connecting pins 530 so that the alternating rows of link plates can articulate.

Each link plate has a pair of teeth, the inner link plates 510a and 510b having teeth 511, which protrude in a first direction. The outer link plates 520a and 520b have teeth 521, which protrude in a second direction opposite to the direction in which the teeth 511 of the inner link plates protrude. Thus, when the chain is in the form of an endless loop, in the central part of the chain widthwise, the inner link plates 510a and 510b have teeth 511 protruding toward the inside of the loop, while along both sides of the chain, the outer link plates 520a and 520b have teeth 521 protruding toward the outside of the loop.

The back surfaces 513 of the outer link plates are typically flat, and co-planar in any straight portion of the chain. Likewise, the back surfaces 523 of the inner link plates are typically flat, and coplanar in any straight portion of the chain.

Figure 8:
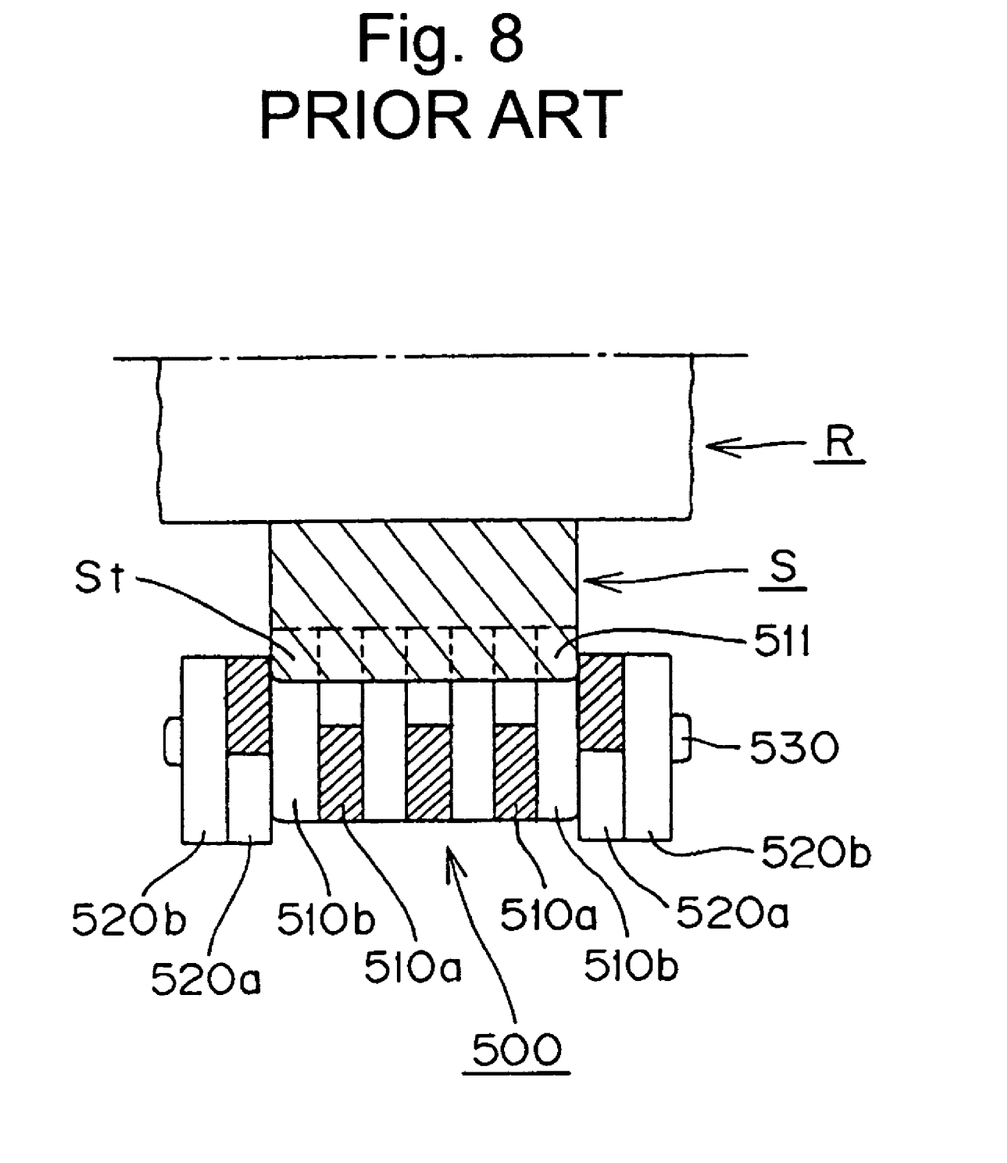
FIG. 8 is a cross-sectional view showing the engagement of inner link plates with a sprocket.

FIG. 8 shows link teeth 511 of the inner link plates 510a and 510b protruding toward the inside of a loop formed by chain 500 and in meshing engagement with sprocket teeth St of a crankshaft sprocket S on a crankshaft R. This double-sided engagement-type chain meshes with the crankshaft sprocket in the same manner in which a conventional single-sided engagement-type chain meshes with a sprocket. The inwardly projecting teeth of the chain come into meshing engagement with camshaft sprockets in a similar manner.

Figure 9:
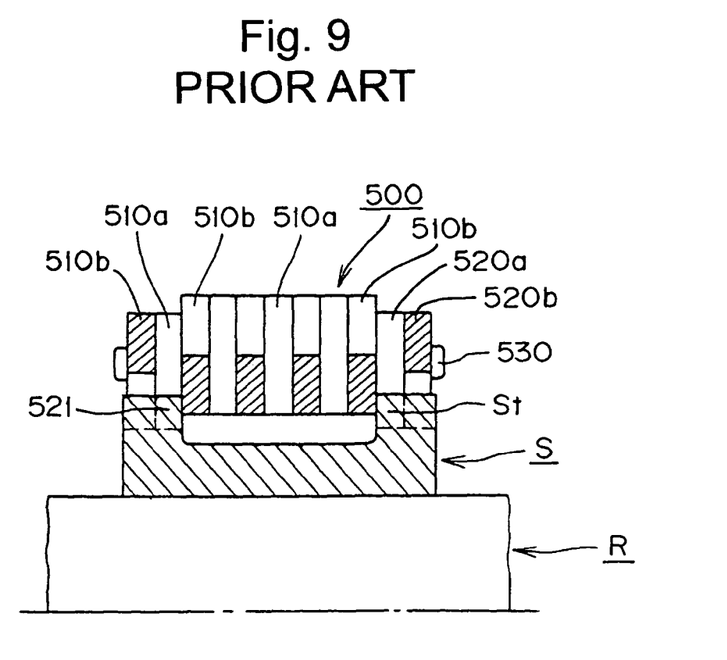
FIG. 9 is a cross-sectional view showing the engagement of outer link plates with another sprocket, at a location indicated by the arrow A in FIG. 7.
Figure 10:
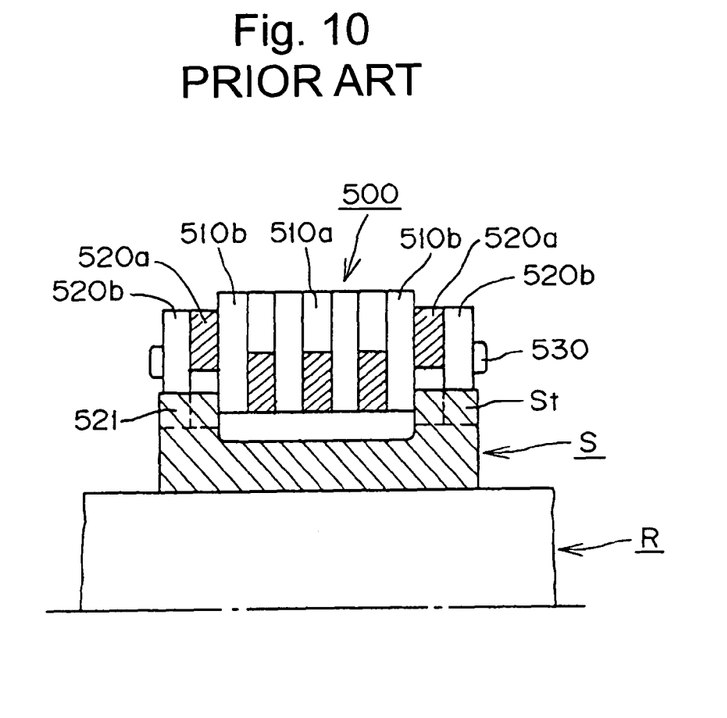
FIG. 10 is a cross-sectional view showing the engagement of outer link plates with the same sprocket at a location indicated by the arrow B in FIG. 7.
Figure 11:
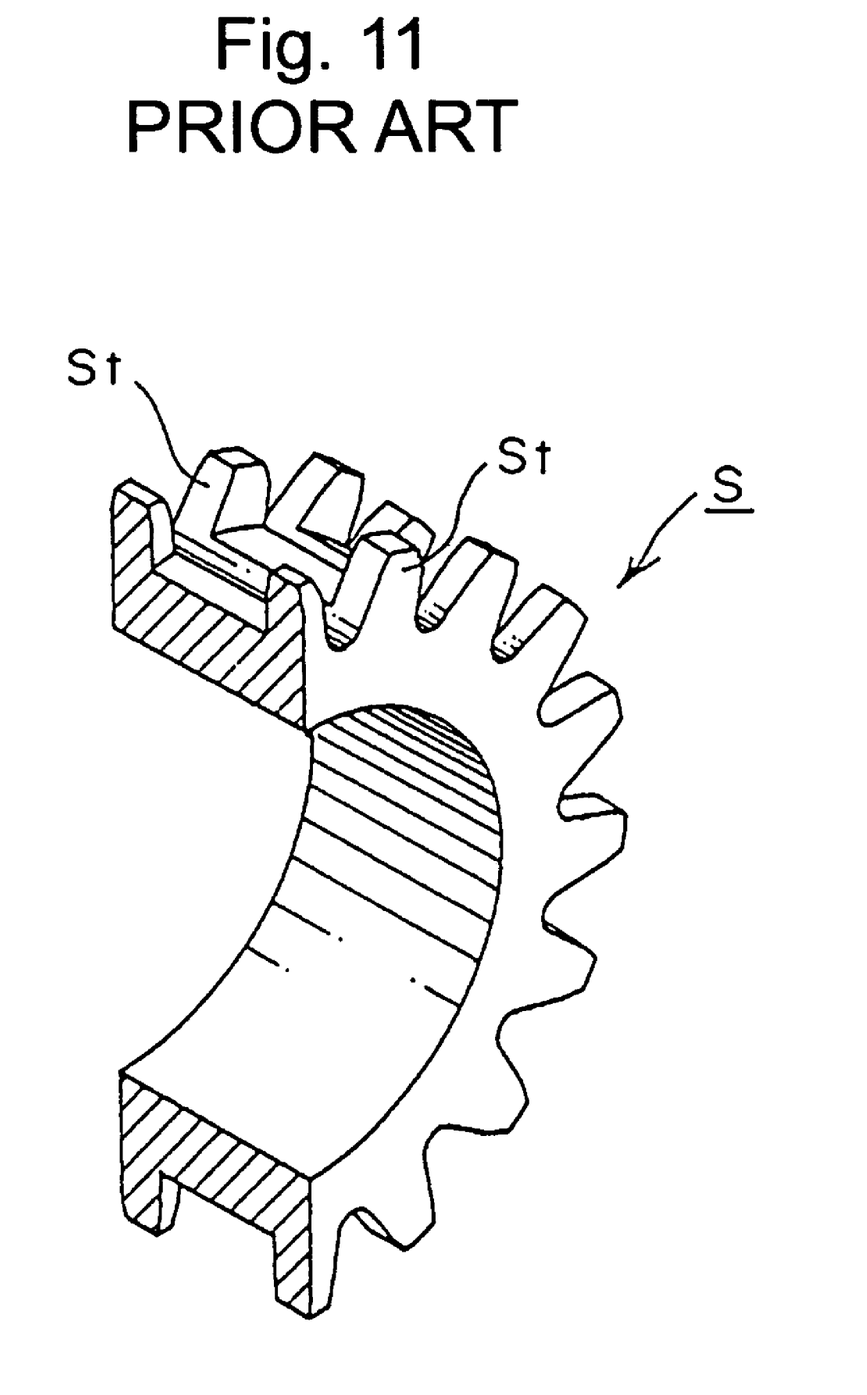
FIG. 11 is a perspective view, partly in cross-section, showing a sprocket with which outer link plates engage.

FIGS. 9 and 10 show how teeth 521 of outer link plates 520a and 520b engage sprocket teeth St of a sprocket S, on a shaft R, and disposed on the outside of the loop formed by the chain. As shown in FIG. 11, the sprocket has two sets of teeth, the two sets being axially spaced from each other by a distance such that they can mesh with the teeth of the outer link plates 520a and 520b.

When the link teeth 521 of the outer link plates 520a and 520b engage with the sprocket, the inner link plates 510b come into sliding contact with the inner wall surfaces of the sprocket teeth St. Contact between the inner link plates 510b and the inner wall surfaces of the sprocket teeth prevents lateral wobbling movement of the chain.

As explained above, in the conventional double-sided engagement type silent chain 500, a connecting pin 530 is fitted to the pin hole 512 of the outermost side link plate 520b. The stress applied to the inner circumferential surface of the pin hole 512 in the outermost link plate 520b when outer link plates 520a and 520b both engage a sprocket, and the tensile stress generated at the inner circumferential surface of the pin hole 512 when the connecting pin 530 is fitted to the pin hole, act synergistically to reduce the strength of the outermost link plate 520b.

Since, in the conventional double-sided engagement-type silent chain, the inner link plates 510a and 510b and the outer link plates 520a and 520b have the same shape, the central portions of links, which extend from the tooth gap bottoms to the back surfaces of the link plates are poor in strength. In particularly, when a load is applied to an outermost link plate 520b, that is, a link plate to which a connecting pin 530 is fitted, cracks tend to occur in the vicinity of the tooth gap bottoms, causing a progressive decrease in the strength of the chain, and a reduction of the rotational fatigue strength of the chain.

Furthermore, although link teeth 521 are formed on the outermost link plates 520b, guide plates having no link teeth can be used instead. In such a case, increased wear can occur in the sprocket teeth where they contact the link teeth 521 of the outer link plates 520a adjacent the guide plates. Increased wear can also occur in the teeth 521. In order to suppress this wear, the plate thickness or the number of the outer link plates can be increased. However, these measures increase the overall width of the chain, which is disadvantageous because more space is required to accommodate the increased width of the chain.

When the shaft of an auxiliary device such as an oil pump or the like is driven by a sprocket engaged with the outer link plates 520a and 520b on the exterior of the chain loop, the number of the outer link plates 520a and 520b is ordinarily smaller than the number the inner link plates. As a result, bending and sliding loads exerted between the pin holes of the outer link plates 520a and the connecting pins 530 become large and cause increased contact wear between the pin holes of the outer link plate 520a and the connecting pins 530.

When the conventional double-sided engagement type silent chain 500 is in driven relationship with an engine crankshaft sprocket and in driving relation ship with an intake valve cam sprocket and an exhaust valve cam sprocket, the teeth of link plates 510a and 510b are disposed on the inner circumferential side of the chain loop and engageable with the sprocket teeth. Contact wear between the pin holes of these link plates 510a and 510b and the connecting pins 530 causes wear elongation of the chain.

An object of this invention is to address the above-mentioned problems by providing a double-sided engagement type silent chain in which the outermost link plates, into which the connecting pins are fitted, have improved impact resistance and fatigue strength in order to suppress the generation of cracks in their tooth gap bottoms when they collide with a sprocket, and in which the wear resistance of the inner link plates is also improved so that contact wear between the pin holes of the inner link plate and the connecting pins is reduced, and the resulting chain wear elongation is suppressed.

SUMMARY OF THE INVENTION

The double-sided engagement type silent chain according to the invention comprises a number of link plates, each having a pair of pin holes and a flat back surface. At least some of the link plates are formed with a pair of teeth for engaging teeth of a sprocket. The link plates are interleaved in alternate rows, which are articulably interconnected to form an endless loop by connecting pins received in the pin holes.

The link plates of the chain include a plurality of inner link plates, disposed at intermediate locations in the widthwise direction of the chain, between sides thereof. The inner link plates having teeth protruding toward the interior of the loop. The link plates also include a plurality of outer link plates disposed along both sides of the chain. The outer link plates include outermost link plates on both sides of the chain, and outer link plates adjacent the outermost link plates but disposed inward with respect to the outermost link plates in the widthwise direction of the chain.

The connecting pins are secured to the pin holes of the outermost link plates by an interference fit, and extend through, and fit rotatably in, the pin holes of the other link plates. The minimum height measured from the back surface to the tooth gap bottom of the outermost link plates is greater than the corresponding minimum height of the inner link plates. In other words, the back surface height, i.e. the shortest distance between the tooth gap bottom and the back surface of the link plate is greater in the outermost link plates than in the inner link plates.

The link plates are composed of a bainite and martensite-mixed plate material. Bainite is steel formed by austempering, having an acicular structure of ferrite and carbides, exhibiting considerable toughness and combining high strength with high ductility. Martensite is a metastable transitional structure formed by a shear process during a phase transformation, and is characterized by an acicular or needle-like pattern. In carbon steel, it is a hard, supersaturated solid solution of carbon in a body-centered tetragonal lattice of iron.

A characterizing feature of the invention is the relationship between the bainite mixing ratios in the link plates and between the martensite mixing ratios in the link plates. The term "bainite mixing ratio" refers to the ratio of volume of bainite to the total volume of the bainite and martensite-mixed plate material, and the term "martensite mixing ratio" refers to the ratio of the volume of martensite to the total volume of the bainite and martensite-mixed plate material.

The bainite mixing ratio in the outermost link plates is higher than the bainite mixing ratio in the inner link plates and the outer link plates adjacent the outermost link plates. However, the martensite mixing ratio in the inner link plates and the outer link plates adjacent the outermost link plates is higher than the martensite mixing ratio in the outermost link plates.

Preferably the outer link plates adjacent the outermost link plates have teeth shaped to seat on the teeth of a sprocket, with their outer flanks in engagement with the sprocket teeth.

The double-sided engagement type silent chain of the invention is typically incorporated into an engine timing transmission to transmit power from a crankshaft sprocket to one or more camshaft sprockets, and to an auxiliary device such as an oil pump, driven by the outwardly projecting teeth of the chain. Since the heights of the back surfaces of the outermost link plates is higher than the heights of a back surfaces of the inner link plates, even if the inner circumferential surfaces of the pin holes of the outermost link plates are subjected to excessive stress at the start of engagement with the teeth of a sprocket, the generation of cracks at the tooth gap bottoms of the outermost link plates is suppressed, and the fatigue strength of the entire chain can be improved.

Because the bainite mixing ratio in the outermost link plates is higher than the bainite mixing ratio in the inner link plates and outer link plates adjacent the outermost link plates, the outermost link plates, into which the connecting pins are fitted, exhibit increased impact resistance and fatigue strength. Thus, the generation of cracks at the tooth gap bottoms of the outermost link plates, is further suppressed.

Furthermore, because the martensite mixing ratio in the inner link plates and the outer link plates adjacent the outermost link plates is higher than the martensite mixing ratio in the outermost link plates, the wear resistance of the inner link plates and the outer link plates adjacent the outermost link plates is improved, contact wear between the pin holes of these link plates and the connecting pins is suppressed, and wear elongation of the chain is reduced.

When the outer link plates adjacent the outermost link plates are shaped so that they become seated on a sprocket with their outer flanks in engagement with the sprocket teeth, engagement of the sprocket teeth with the inside flanks the link teeth can be avoided. Thus, the generation of cracks in the tooth gap bottoms of these outer link plates due to high loads encountered upon the collision of their teeth with the teeth of an auxiliary equipment driving sprocket, can be suppressed.

DETAILED DESCRIPTION OF THE PREFERRED EMBODIMENTS

Figure 1:
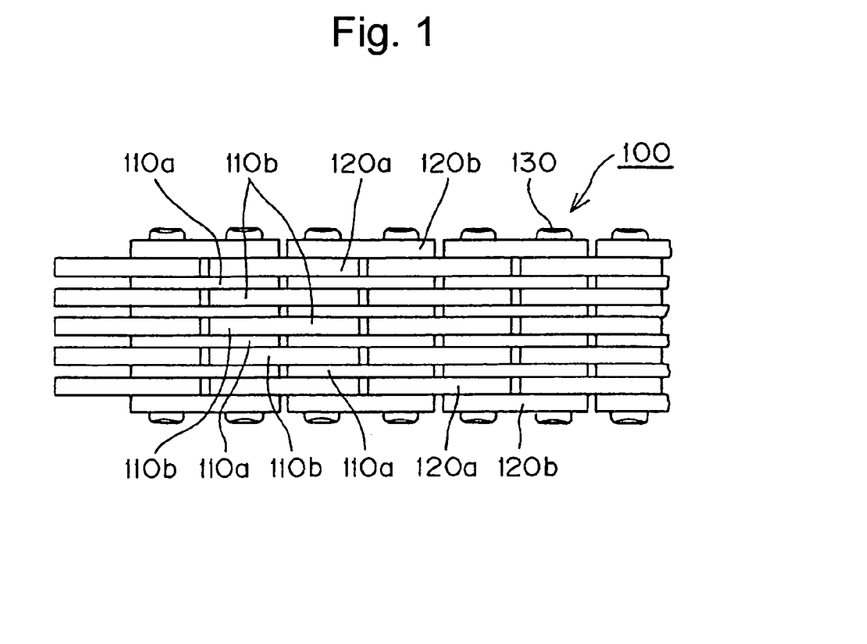
FIG. 1 is a plan view of a part of a double-sided engagement type silent chain in accordance with a first embodiment of the invention.
Figure 2:
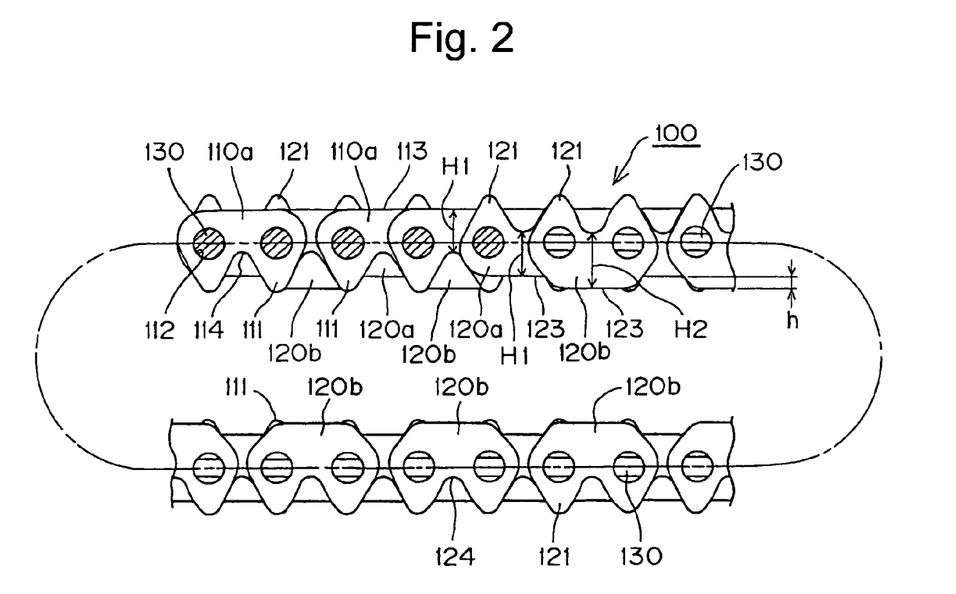
FIG. 2 is a partially cut-away side elevational view of portions of the chain shown in FIG. 1.

Shown in FIGS. 1 and 2, is a double-sided engagement type silent chain in accordance with a first embodiment of the invention. The chain is in the form of an endless loop, as shown in FIG. 2, and comprises link plates 110a, 110b, 120a, and 120b. Link plates 110a and 110b are inner link plates, each having a pair of teeth 111 that protrude toward the interior of the loop. Link plates 120a and 120b are outer link plates, each having a pair of teeth 121 that protrude toward the exterior of the loop. The link plates are arranged in two kinds of widthwise rows. A first kind of row consists of inner link plates 110a and outermost link plates 120b, and a second kind of row consists of link plates 120a, which are adjacent the outermost link plates, and inner link plates 110b. The two kinds or rows are interleaved with one another in alternating relationship. The link plates are connected by connecting pins 130, which are fitted into pin holes in the outermost link plates 120b with an interference fit, and which fit rotatably in the pin holes, e.g., pin hole 112, of the other link plates 110a, 110b and 120a. With the link plates so arranged, the chain has two spaced sets of outwardly protruding teeth on the outer link plates along both sides of the chain, and a set of inwardly protruding teeth on the inner link plates. The inner link plates 110a and 110b, and the outer link plates 120a and 120b, have the same chain pitch, and also have flat back surfaces 113 and 123, respectively.

As shown in FIG. 2, the minimum height H2 of the back surfaces 123 of the outermost link plates 120b, measured at a central location in the link plate from the tooth gap bottom 124 to the back surface, is greater, by an amount h, than the minimum height H1 of the back surfaces of the inner link plates 110a and 110b, and also greater, by an amount h, than the corresponding minimum height H1 of the outer link plates 120a, which are adjacent the outermost link plates.

Although the heights H2 of the outermost link plates are greater than the heights H2 of the inner link plates and the outer link plates 120a, the height H2 of can vary in accordance with plate strength requirements or other requirements.

The heights H1 and H2 of the link plates are the shortest distances measured at a central location substantially midway between the pin holes, from the tooth gap bottom between the pair of link teeth to the back surface of the link plate.

Since the height of the back surfaces of the outermost link plates 120b is greater than the heights of back surfaces of the inner link plates, even if an excessive stress is applied to the inner circumferential surfaces of the pin holes of the outermost link plates, in which the connecting pins are fitted, generation of cracks at the tooth gap bottoms 124 of the outermost side link plate 120b is suppressed, and the fatigue strength of the chain is improved.

As shown in FIGS. 1 and 2, the inner link plates 110a and 110b are located at an intermediate location between the sides of the chain, and their teeth protrude toward the inside of the loop in the same way that the teeth of a conventional one-sided engagement type silent chain protrude. Preferably the number of inner link plates in the widthwise direction is an odd number, and the number is seven in the embodiment shown in FIG. 1.

The outer link plates 120a and the outermost link plates 120b are provided along both sides in the widthwise direction of the chain, and their link teeth 121 protrude toward the outside of the loop. The number of outer link plates in the widthwise direction is preferably an even number, in this case, four.

The connecting pins are preferably fitted to the pin holes of the outermost link plates 120b by an interference fit. That is, they can be press-fit in the pin holes outermost link plates. Alternatively, the pins can be secured to the outermost link plates by caulking or the like.

The link plates are composed of a plate material comprising a mixture of bainite and martensite. The bainite mixing ratio in the outermost link plates 120b is higher than the bainite mixing ratio in the inner link plates 110a and 110b, and in outer link plates 120a. However, the martensite mixing ratio in the inner link plate 110a and 110b and in the outer link plates 120a, is higher than the martensite mixing ratio in the outermost link plate 120b. Consequently, the impact resistance and fatigue strength of the outermost link plates 120b, to which the connecting pins 130 are secured, is improved so that the generation of cracks at the tooth gap bottoms 124 of the outermost link plates is suppressed. On the other hand, the high martensite mixing ratio in the inner link plates 110a and 110b and in the outer link plates 120a imparts improved wear resistance to these link plates so that contact wear between their pin holes and the connecting pins is suppressed, and wear elongation of the chain is reduced.

Preferably, the pin holes of the outer link plates have their inner circumferential surfaces covered with a hardened metal carbide layer consisting of at least one carbide from the group consisting of carbides of Cr, Ti, V and Nb. Alternatively, or additionally, the inner circumferential surfaces of the pin holes of the inner link plate may be covered with a hardened metal carbide layer consisting of at least one carbide from the group consisting of carbides of Cr. Ti, V and Nb.

In the chain according to the invention, intensive contact wear between the pin holes of the outer link plates 120a and the connecting pins 130 is significantly suppressed, and adhesion between the pin holes of the outer link plates 120a and the connecting pins is suppressed even when lubrication is marginally adequate. Furthermore, with the metal carbide layer, the link plates exhibit good resistance to corrosion by sulfuric acid contained in diesel engine oil. Therefore, the range of application of the chain can be significantly broadened.

As mentioned above, even if engagement with a sprocket tooth causes excessive stress to be applied to an inner circumferential surface of a pin hole of an outermost link plate to which a connecting pin is secured, generation of a crack at the tooth gap bottom is suppressed and the fatigue strength of the entire chain is improved. It is preferable, therefore, that the height of the back surfaces of the outermost link plates be higher than the height of the back surfaces of the inner link plates. The height of the back surfaces of the outer link plate adjacent the outermost link plates may also be higher than the height of the back surfaces of the inner link plates.

Figure 3:
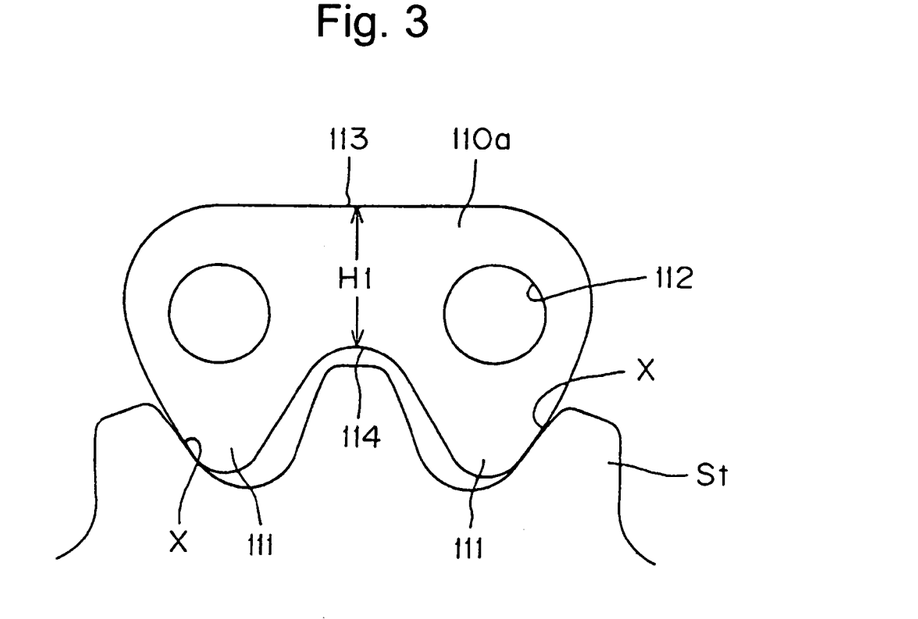
FIG. 3 is an enlarged view showing a link plate of a silent chain, seated by engagement of its outer flanks with teeth of a sprocket.
Figure 4:
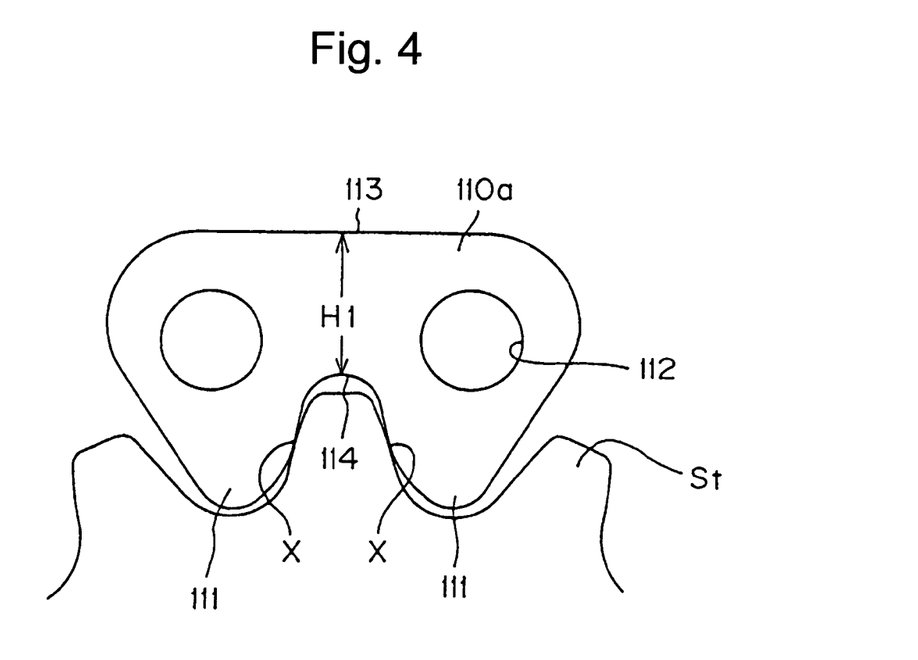
FIG. 4 is an enlarged view showing a link plate of a silent chain, seated by engagement of its inner flanks with teeth of a sprocket.

The link plates in the chain according to the invention may be formed for any of three types of engagement and seating on a sprocket. For example, the plates can be formed so that their inner flanks contact the sprocket teeth upon the start of engagement, and also engage the sprocket teeth when the plates are seated on the sprocket. This type of plate is depicted in FIG. 4, where the symbol "X" denotes the point of contact when the plate is seated on a sprocket tooth St. In a second type of engagement, the plates can be formed so that their inner flanks contact the sprocket teeth upon the start of engagement, but their outer flanks engage the sprocket teeth when the plates are seated on the sprocket. In the third type of engagement, the plates can be formed so that their outer flanks contact the sprocket teeth upon the start of engagement, and also engage the sprocket teeth when the plates are seated on the sprocket. This type of plate is depicted in FIG. 3, where the symbol "X" denotes the points of contact when the plate is seated on the sprocket teeth St. In the third type, there is no engagement between the sprocket teeth and the inner flanks of the link teeth. Thus the load on the central portion of the link plate can be reduced, and impact resistance and fatigue strength of the link plate can be improved.

The inner circumferential surfaces of the pin holes of the outer link plates 120a are preferably covered with a chromium carbide layer (not shown) having a surface hardness of Hv 1800 or more, and a thickness of 6 μm to 20 μm.

In the double-sided engagement type silent chain 100, the wear losses of the pin holes of the outer link plates 120a, and the pin holes 112 of the inner link plates 110a and 110b, are made uniform, and the load is uniformly dispersed and shared. Thus, localized intense contact wear between the pin holes of the outer link plates 120a and the connecting pins 130 is significantly suppressed.

When the inner circumferential surfaces of the pin holes are covered with layer having a surface hardness of Hv 1800 or more, the surface becomes extremely hard and highly resistant to wear even when small amounts of solid component are present in the lubricating oil. The hardened layer is chemically stable, and its affinity with the connecting pin 130 is small. Thus, adhesion between the pin hole of the outer link plate 120a and the connecting pin 130 is suppressed even when lubrication is marginal. Moreover the pin holes exhibit high resistance to corrosion by sulfuric acid contained in diesel engine oil.

In the double-sided engagement type silent chain 100, since the bainite mixing ratio in the outermost link plates 120b, to which the connecting pins 130 are fitted, is higher than the bainite mixing ratio in the inner link plates 110a and 110b and the outer link plates 120a, and the martensite mixing ratio in the inner link plates 110a and 110b and the outer link plates 120a is higher than the martensite mixing ratio in the outermost link plates 120b, the impact resistance and fatigue strength of the outermost link plates 120b is improved. Moreover the generation of cracks in a tooth gap bottoms 124 of the outermost link plates 120b as the plates collide with sprocket teeth is suppressed. At the same time, the wear resistance of the inner link plates 110a and 110b is improved so that the contact wear between the pin holes 112 of inner link plates 110a and 110b and the connecting pins 130 is suppressed and wear elongation of the chain is reduced. Further, since the inner circumferential surfaces of the pin holes in the outer link plates 120a are covered with a hardened metallic carbide layer such as chromium carbide, intense, localized, contact wear between the pin holes of the outer link plates 120a and the connecting pins 130 can be significantly suppressed, and adhesion between the pin holes of the outer link plates 120a and the connecting pins 130 is suppressed even when lubrication is marginal.

Furthermore, since the height of the back surfaces of the outermost link plates 120b is higher than the height of the back surfaces of the adjacent outer link plates 120a and the inner link plates 110a and 110b, even if excessive stress is applied to the inner circumferential surfaces of the pin holes of the outermost link plates 120b at the start of engagement with a sprocket tooth, the generation of cracks in the tooth gap bottoms 124 of the outermost link plates 120b is suppressed, so that the impact resistance and fatigue strength of the entire chain is improved. Thus the invention exhibits significant advantages over the prior art.

Figure 5:
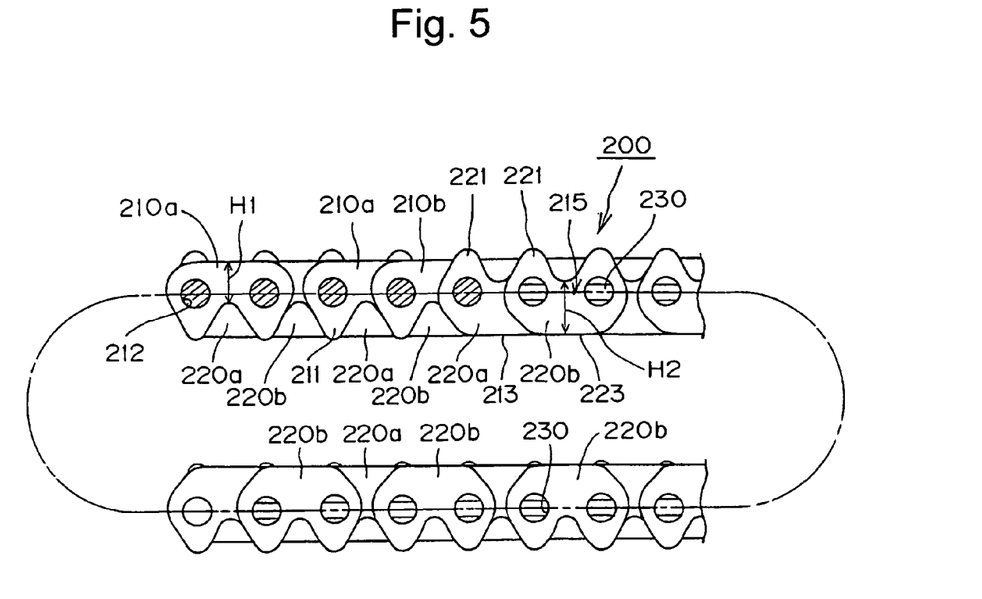
FIG. 5 is a partially cut-away side elevational view of portions of a double-sided engagement type silent chain according to a second embodiment of the invention.

A second embodiment of the invention, shown in FIG. 5, is different from the chain 100 of the first embodiment in that the outer link plates 220a adjacent the outermost link plates 220b as well as the outermost side link plate 220b both have back surfaces that are higher than the back surfaces of the inner link plates 210a and 210b, and in that the outer link plates 220a and the outermost link plates 220b are formed so that their outer flanks contact the sprocket teeth upon engagement with a sprocket, and also contact the sprocket teeth when the link plates are seated on a sprocket. Otherwise, the configuration of the second embodiment is basically the same as that of the first embodiment.

Both the outer link plates 220a and outermost link plates 220b have their flat back surfaces, 213 and 223, respectively, at the same level. The heights H2 of the back surfaces 213 and 223 are equal, and greater than the height H1 of the back surfaces of the inner link plates 210a and 210b.

In the embodiment shown in FIG. 5, the inner link plates 210a and 210b, are formed so that an inner flank contacts a sprocket tooth on engagement, but outer flanks contact the sprocket teeth on seating. The outer link plates 220a and the outermost link plates 220b, however, are formed so that an outer flank contacts a sprocket tooth on engagement, and the outer flanks contact sprocket teeth when a link plate is seated on the sprocket.

The chain 200, according to the second embodiment of the invention, exhibit the same effects as the chain of the first embodiment. In the second embodiment, since the heights H2 of the back surfaces of the outermost link plates 220b and the outer link plates 220a are equal, when the silent chain comes into contact with a shoe (not shown) on a chain guide, the back surfaces 213 and 223 both contact the sliding contact surface of the shoe, with the result that the contact area is increased and wear of the shoe can be reduced.

Moreover, since the outer link plates 220a, and the outermost link plates 220b, are both shaped to engage and seat with outer flank contact only, engagement of a sprocket with the inside of a link tooth can be avoided, and generation of cracks at the tooth gap bottoms can be avoided when the chain comes into engagement with the driving sprocket of an oil pump or other auxiliary device.

We claim:

1. A double-sided engagement type silent chain comprising a number of link plates, each having a pair of pin holes and a flat back surface, and at least some of said link plates being formed with a pair of teeth for engaging teeth of a sprocket, the link plates being interleaved in alternate rows the rows being articulably interconnected to form an endless loop by connecting pins received in the pin holes;

wherein the link plates of the chain include a plurality of inner link plates, disposed at intermediate locations in the widthwise direction of the chain, between sides thereof, said inner link plates having teeth protruding toward the interior of the loop with a tooth gap, and a plurality of outer link plates disposed along both sides of the chain and having teeth protruding toward the exterior of the loop with a tooth gap, the outer link plates including outermost link plates on both sides of the chain, said outermost link plates being the widthwise outermost plates of the chain, and outer link plates adjacent the outermost link plates but disposed inward with respect to the outermost link plates in the widthwise direction of the chain, said pins being secured to the pin holes of the outermost link plates by an interference fit, and extending through, and fitting rotatably in, the pin holes of the other link plates;

wherein the minimum height, measured from the back surface to the tooth gap bottom of the outermost link plates is greater than the corresponding minimum height of the inner link plates; and wherein said link plates are composed of a bainite and martensite-mixed plate material, the bainite mixing ratio in said outermost link plates is higher than the bainite mixing ratio in the inner link plates and the outer link plates adjacent the outermost link plates, and the martensite mixing ratio in said inner link plates and said outer link plates adjacent the outermost link plates is higher than the martensite mixing ratio in the outermost link plates.

2. A double-sided engagement type silent chain according to claim 1, in which said outer link plates adjacent the outermost link plates have teeth shaped to seat on the teeth of a sprocket, with their outer flanks in engagement with the sprocket teeth.

* * * * *